(12) United States Patent
Wu et al.

(10) Patent No.: US 7,405,426 B2
(45) Date of Patent: Jul. 29, 2008

(54) ACTIVE DEVICE ARRAY SUBSTRATE

(75) Inventors: Ming-Zen Wu, Renwu Township, Kaohsiung County (TW); Chien-Chih Jen, Taipei (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 205 days.

(21) Appl. No.: 11/246,658

(22) Filed: Oct. 6, 2005

(65) Prior Publication Data

US 2007/0080348 A1 Apr. 12, 2007

(51) Int. Cl.
*H01L 29/04* (2006.01)
(52) U.S. Cl. ............... 257/59; 257/72; 257/E39.003
(58) Field of Classification Search ............... 257/59, 257/57, 72, 257, 290, 368, E39.003, E33.046
See application file for complete search history.

(56) References Cited

U.S. PATENT DOCUMENTS 6,249,326 B1   6/2001   Hebiguchi ............... 349/42

2007/0045625 A1*   3/2007   Chen et al. ............... 257/59

* cited by examiner

*Primary Examiner*—Howard Weiss
*Assistant Examiner*—Hoa B Trinh
(74) *Attorney, Agent, or Firm*—J.C. Patents

(57) ABSTRACT

An active device array substrate is provided. The active device array substrate comprises a substrate, multiple first lines, second lines, active devices, pixel electrodes and common lines. The first lines and second lines are disposed on the substrate and they form multiple pixel regions on the substrate. The active devices are respectively disposed in the pixel regions and each of the active devices is electrically connected to a first line and a second line, respectively. The pixel electrodes are respectively disposed in the pixel regions and each of the pixel electrodes is electrically connected to an active device, respectively. The common lines and first lines are roughly parallel and they are staggeringly disposed on the substrate. Each of the common lines has multiple branches which extend outside from their edges of two sides, and each of these branches is partly overlapped with the second lines.

10 Claims, 2 Drawing Sheets

ACTIVE DEVICE ARRAY SUBSTRATE

BACKGROUND OF THE INVENTION

1. Field of Invention

The present invention relates to a device array substrate. More particularly, the present invention relates to an active device array substrate.

2. Description of Related Art

As the need for displays grows rapidly, the industries have devoted to the developments related to displays. The cathode ray tube (CRT) display, in particular, has played a dominant role in the display market for years as result of its extraordinary displaying quality and technical maturity. Since the displays with minor power consumption and lesser radiation lead by the thriving concepts for the environment protection recently are demanded and that requires, the traditional CRT display cannot meet these requirements. Also, the traditional CRT display is strictly limited in its size and shape, and thus it cannot fulfill the market trends to design and produce the display as a light, thin, small and exquisite gadget. Hence, the thin film transistor liquid crystal display (TFT-LCD) that features high resolution, low consumption, no radiation and so forth, has become the mainstream in the display marketplace.

FIG. 1 schematically shows a top view of a traditional TFT array substrate. Please refer to FIG. 1. The traditional TFT array substrate 100 comprises a substrate 110, a plurality of scan lines 120, a plurality of data lines 130, a plurality of common lines 140, a plurality of TFTs 150 and a plurality of pixel electrodes 160. Wherein, the scan lines 120 and data lines 130 are disposed on the substrate 100 and they construct a plurality of pixel regions 10a. The TFTs 150 are respectively disposed in these pixel regions 110a and each of the TFTs 150 is electrically connected to a scan line 120 and a data line correspondingly. The pixel electrodes 160 are respectively disposed in these pixel regions 110a and each of the pixel electrodes 160 is electrically connected to a TFT 150 correspondingly.

The common lines 140 and scan lines 120 are roughly parallel and they are staggeringly disposed on the substrate 110. Each of the common lines 140 has a plurality of branches 140a extending outside from their edges of two sides and these branches 140a are adjacent to these data lines 130. Additionally, since these branches 140a are partly overlapped with the edge of each of pixel electrodes 160, the branches 140a can not only raise the storage capacitance value Cst but provide the shielding for the abnormal alignment region between each of pixel electrodes 160 and these data lines 130. Nevertheless, due to the limitations of line widths for these branches 140a and the requirements of alignment precision for each layer in the traditional TFT array substrate 100, the aperture ratio of the TFT array substrate 100 cannot be further increased.

SUMMARY OF THE INVENTION

In view of this, the object of the present invention is to provide an active device array substrate with a higher the aperture ratio.

Based on the above-mentioned object or others, the present invention provides an active device array substrate comprising a substrate, a plurality of first lines, a plurality of second lines, a plurality of active devices, a plurality of pixel electrodes and a plurality of common lines. Wherein, the first lines and the second lines are disposed on the substrate and they construct a plurality of pixel regions on the substrate. These active devices are respectively disposed in the pixel regions and each of the active devices is electrically connected to a first line and a second line, respectively. The pixel electrodes are respectively disposed in the pixel regions and each of the pixel electrodes is electrically connected to an active device, respectively. The common lines and the first lines are roughly parallel, and they are staggeringly disposed on the substrate. Each of the common lines has a plurality of branches which extend outside from the edges of either sides, and each of these branches is overlapped with the second lines.

According to one embodiment of the present invention, the first lines can be scan lines and the second lines can be data lines.

According to one embodiment of the present invention, the branches can be located below the second lines.

According to one embodiment of the present invention, the branches can be located above the second lines.

According to one embodiment of the present invention, the first lines and the common lines can belong to one identical layer.

According to one embodiment of the present invention, the branches can be partly overlapped with the pixel electrodes, respectively.

According to one embodiment of the present invention, each active device can be a thin film transistor or a diode. In addition, the thin film transistor can be a top gate thin film transistor or a bottom gate thin film transistor.

According to one embodiment of the present invention, the material of pixel electrodes can be indium tin oxide (ITO), indium zinc oxide (IZO) or aluminum zinc oxide (AZO).

Based on the descriptions above, the branches of the common lines and the second lines are overlapped, and therefore the active device array substrate of the present invention has a higher aperture ratio and a higher storage capacitance value Cst.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
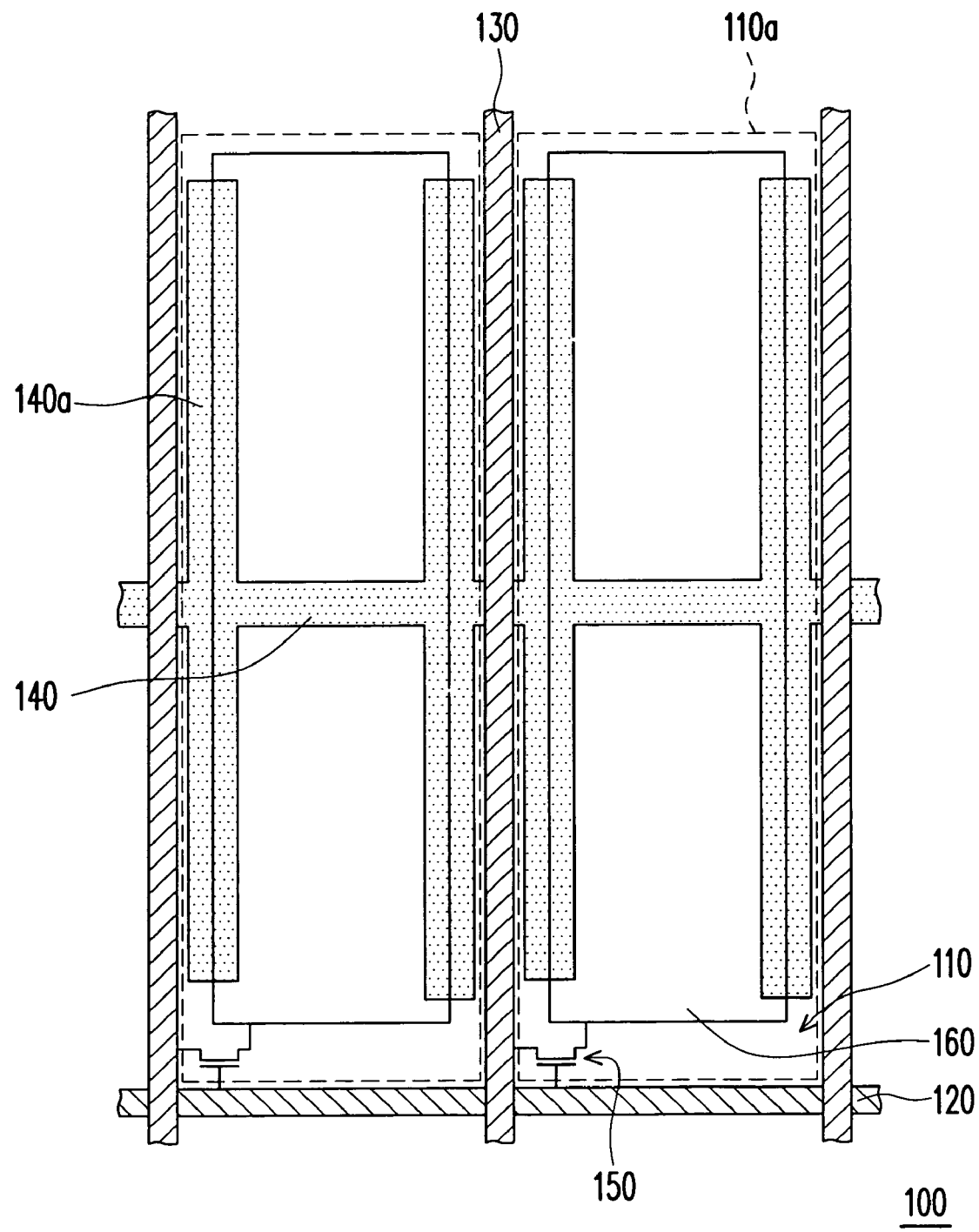
FIG. 1 schematically shows a top view of a traditional active device array substrate.
Figure 2:
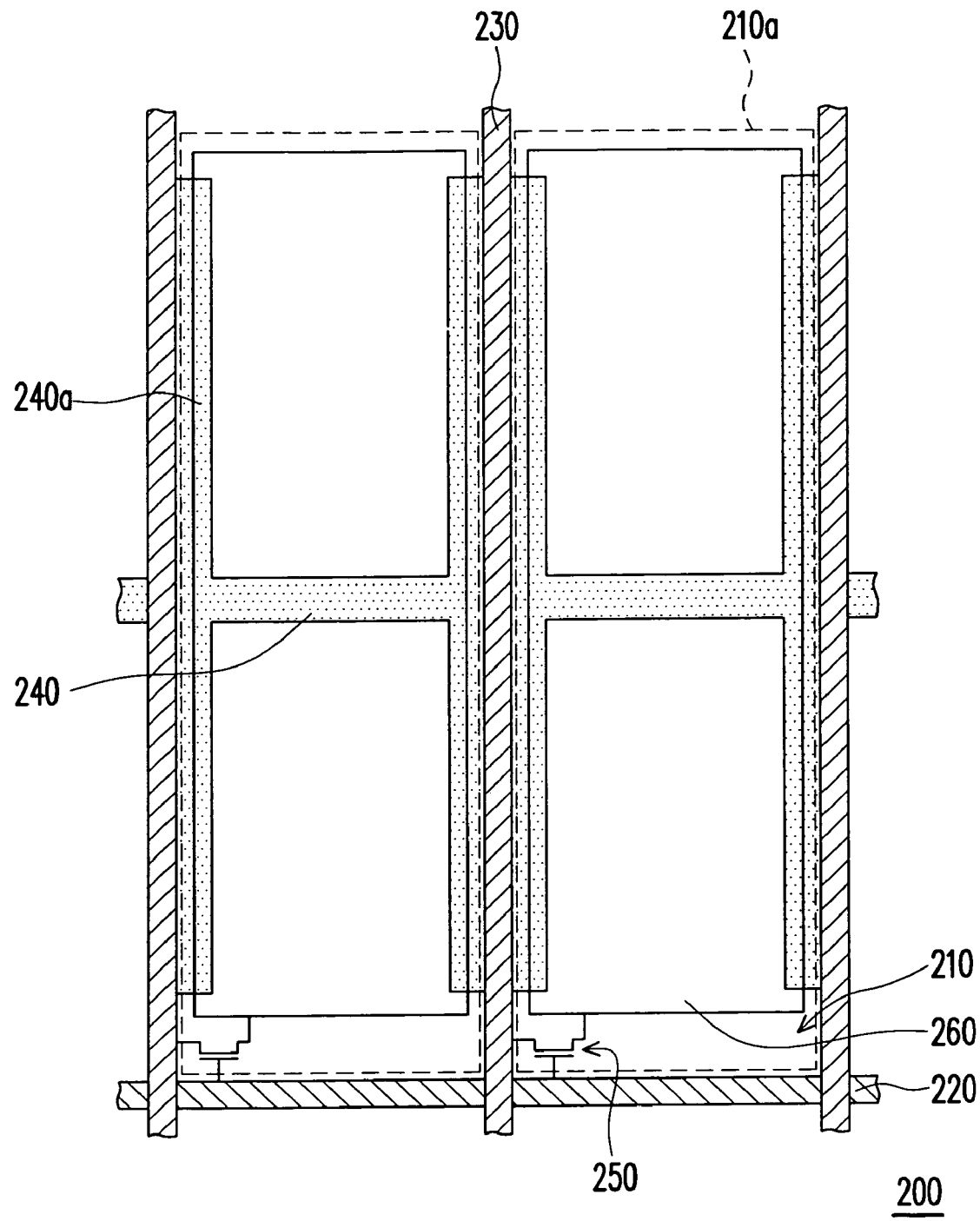
FIG. 2 schematically shows a top view of an active device array substrate according to one embodiment of the present invention.

FIG. 2 schematically shows a top view of an active device array substrate according to one embodiment of the present invention. Please refer to FIG. 2. In the present embodiment, the active device array substrate 200 comprises a substrate 210, a plurality of first lines 220, a plurality of second lines 230, a plurality of common lines 240, a plurality of active devices 250 and a plurality of pixel electrodes 260. Here, the first lines 220 and second lines 230 are disposed on the substrate 210 and they construct a plurality of pixel regions 210a on the substrate 210. Besides, these pixel regions 210a are arranged in a matrix. In the present embodiment, the first lines 220 are scan lines and the second lines 230 are data lines. Otherwise, in another embodiment, the first lines 220 may be data lines and the second lines 230 may be scan lines. Additionally, the substrate 210 can be a glass substrate, a quartz substrate or any of the transparent substrates.

The common lines 240 and the first lines 220 are roughly parallel and they are staggeringly disposed on the substrate 210. Besides, the common lines 240 and first lines 220 may belong to one identical layer. Furthermore, the active devices 250 are respectively disposed in the pixel regions 210a and each of the active devices 250 is electrically connected to a scan line 220 and a second line 230 correspondingly. The active devices 250 may be thin film transistors (TFTs), diodes or other appropriate active devices, for example. For the present embodiment, these active devices 250 are TFTs with bottom gates. Otherwise, these active devices 250 may be TFTs with top gates as well.

The pixel electrodes 260 are respectively disposed in the pixel regions 210a and each of the pixel electrodes 260 is electrically connected to an active device 250 correspondingly. In addition, the material of pixel electrodes 260 may be indium tin oxide (ITO), indium zinc oxide (IZO), or other transparent conductive materials. It's worthy to note that, each of the common lines 240 has a plurality of branches 240a extending outside from their edges of two sides and these branches 240a are overlapped with these second lines 230, respectively. As these branches 240a are respectively overlapped with these second lines 230, the active device array substrate 200 can have higher storage capacitance value Cst.

In more detail, these branches 240a may be located above or below the second lines 230. For example, when the active devices 250 are the TFTs with bottom gates, the branches 240a are located below the second lines 230 (data lines). Likewise, when the active devices 250 are the TFTs with top gates, the branches 240a are located above the second lines 230 (data lines). It's also worthy to note here, these branches 240a may be partly overlapped with the edges of these pixel electrodes 260, respectively. That is, these branches 240a can provide the shielding for the abnormal alignment region between each the pixel electrode 260 and these second lines 230.

It's worthy to note that, due to overlapping for the branches 240a of the common lines 240 and the second lines 230, RC loading of the second lines 230 is raised. The active device array substrate 200 based on the present invention, due to having the maximum value of RC loading for driving IC, owns the advantages such as a higher aperture ratio, higher storage capacitance Cst and the shielding for the abnormal alignment region between each the pixel electrode 260 and the second lines 230, compared with the traditional active device array substrate.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An active device array substrate, comprising:
    a substrate;
    a plurality of first lines disposed on the substrate;
    a plurality of second lines disposed on the substrate, wherein the first lines and the second lines construct a plurality of pixel regions on the substrate;
    a plurality of active devices which are respectively disposed in the pixel regions, wherein each of the active devices is electrically connected to a first line and a second line, respectively;
    a plurality of pixel electrodes which are respectively disposed in the pixel regions, wherein each of the pixel electrodes is electrically connected to an active device, respectively; and
    a plurality of common lines which are roughly parallel with the first lines, wherein the common lines and the first lines are staggeringly disposed on the substrate and wherein each of the common lines has a plurality of branches extending outside from edges of either sides and each of the branches is overlapped with the second lines.

2. The active device array substrate according to claim 1, wherein the first lines are scan lines and the second lines are data lines.

3. The active device array substrate according to claim 2, wherein the branches are located below the second lines, respectively.

4. The active device array substrate according to claim 2, wherein the branches are located above the second lines, respectively.

5. The active device array substrate according to claim 2, wherein the first lines and the common lines belong to one identical layer.

6. The active device array substrate according to claim 1, wherein the branches are partly overlapped with the pixel electrodes, respectively.

7. The active device array substrate according to claim 1, wherein each active device is a thin film transistor or a diode.

8. The active device array substrate according to claim 7, wherein the thin film transistor is a bottom gate thin film transistor.

9. The active device array substrate according to claim 7, wherein the thin film transistor is a top gate thin film transistor.

10. The active device array substrate according to claim 1, wherein the material of pixel electrodes includes indium tin oxide (ITO), indium zinc oxide (IZO) or aluminum zinc oxide (AZO).

* * * * *